US006570625B1

(12) United States Patent
Kuyama et al.

(10) Patent No.: US 6,570,625 B1
(45) Date of Patent: May 27, 2003

(54) DISPLAY APPARATUS AND DISPLAY METHOD

(75) Inventors: Kazuto Kuyama, Kanagawa (JP); Manabu Suzuki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/226,124

(22) Filed: Jan. 7, 1999

(30) Foreign Application Priority Data

Jan. 8, 1998 (JP) .......................................... 10-002564

(51) Int. Cl.[7] ............................ H04N 5/44; H04N 3/27; H04N 5/46

(52) U.S. Cl. ....................... 348/555; 348/805; 348/488; 348/556; 348/807

(58) Field of Search ................................ 348/725, 728, 348/805–807, 441, 455, 488, 553–556, 564, 565, 558; H04N 5/44, 3/27, 5/48

(56) References Cited

U.S. PATENT DOCUMENTS

| | | | | | |
|---|---|---|---|---|---|
| 4,656,467 | A | * | 4/1987 | Strolle | 342/185 |
| 4,745,477 | A | * | 5/1988 | Bell et al. | 348/530 |
| 4,985,665 | A | | 1/1991 | Sendelweck | |
| 6,268,887 | B1 | * | 7/2001 | Watanabe et al. | 348/443 |
| 6,310,654 | B1 | * | 10/2001 | Oku et al. | 348/441 |
| 6,353,460 | B1 | * | 3/2002 | Sokawa et al. | 348/554 |

FOREIGN PATENT DOCUMENTS

| | | |
|---|---|---|
| DE | 40 08 946 | 6/1991 |
| GB | 2 260 248 | 4/1993 |

* cited by examiner

*Primary Examiner*—John Miller
*Assistant Examiner*—Linus H. Lo
(74) *Attorney, Agent, or Firm*—Rader, Fishman & Grauer PLLC; Ronald P. Kananen, Esq.

(57) ABSTRACT

Anode voltages A' and B' corresponding to video signals A and B are switched by a first switch and supplied to an anode. Cut-off voltages A and B corresponding to the video signals A and B are switched by a second switch and added to a video signal by an adder. A resultant signal is supplied to a cathode. In a CRT, the luminance rises in association with the step-down of the cut-off voltage and the step-up of the anode voltage and the resolution rises in association with the step-up of the cut-off voltage and the step-up of the anode voltage. The first and second switches are switched in accordance with the format of the input video signal respectively, thereby properly selecting the anode voltage which is applied to the CRT and the cut-off voltage. The video image can be displayed by the CRT at the luminance and resolution according to the video signal without changing a driving voltage.

1 Claim, 5 Drawing Sheets

DISPLAY APPARATUS AND DISPLAY METHOD

BACKGROUND OF THE INVENTION

1. Field of the Invention

The invention relates to a display apparatus and a display method in which video signals of a plurality of systems can be individually or simultaneously properly displayed to one CRT.

2. Description of the Related Art

In a video signal which is displayed on a television monitor or the like, a plurality of video systems having different video signal formats exist. As is well known, in a video signal by the television broadcasting, for example, in the NTSC system used in Japan, a system such that the signal is transmitted mainly as a radio wave and an interlace scan is performed at a ratio of 525 lines/59.94 Hz is used. In the HDTV broadcasting for the purpose of obtaining a video image of high resolution, a system of the interlace of 1125 lines/60 Hz is used. In a personal computer, the scan is performed in a non-interlace manner and what is called a multi-scan corresponding to a plurality of kinds of vertical frequencies and horizontal frequencies is generally used and a plurality of kinds of resolutions can be selected as resolutions of a video monitor.

In recent years, in association with the progress of the techniques regarding a home-use television receiver, a monitor for a personal computer, and the like, a display apparatus which can display both of the video signal by the television broadcasting and the video signal that is outputted from the personal computer has been proposed. In such a display apparatus, a system for displaying a video image by using a CRT (Cathode Ray Tube) is a main stream.

It is known that such a kind of display apparatus is realized by combining a construction of multi-scan of the horizontal deflection and vertical deflection in order to display the video signal by the personal computer to a construction of a conventional television receiver such as a tuner which can properly receive a radio wave of the television broadcasting of the NTSC system or HDTV system or a decoder (including a color decoder) for demodulating the received video signal and audio signal.

If the above requirements are merely provided, a sufficient display quality cannot be obtained in the CRT. For instance, when a video image by the television broadcasting is monitored, unless a sufficient luminance of the video image is derived, powerfulness is missing. On the other hand, usually, since the video signal by the personal computer has higher resolution and higher precision as compared with those of the video image by the television broadcasting, importance is paid to the focusing characteristics rather than the luminance.

In the conventional CRT monitor, by changing a driving voltage of the CRT in accordance with the kind of signal to be displayed, one CRT is made to correspond to those different video signals, thereby realizing high luminance of the video signal. That is, when the video image by the television broadcasting is displayed, the driving voltage is stepped up, thereby obtaining the video image of high luminance. When the video image by the personal computer is displayed, the driving voltage is stepped down.

However, according to the above method, in a driving voltage generating circuit, a dynamic range of an output voltage is enlarged in association with the step-up of the driving voltage. There is, consequently, a problem such that the costs of the driving voltage generating circuit are raised.

There is also a problem that unnecessary radiation from the CRT and peripheral circuits increases due to the step-up of the driving voltage.

OBJECTS AND SUMMARY OF THE INVENTION

It is, therefore, an object of the invention to provide a display apparatus and a display method which can display video signals of a plurality of kinds of formats by one CRT at proper luminance and resolution without changing a driving voltage.

To solve the foregoing problems, according to the invention, there is provided a display apparatus for displaying video signals of two or more different formats by one CRT, comprising: bias voltage output means for outputting a bias voltage to said CRT; and voltage switching means for switching said bias voltage which is outputted from said bias voltage output means in accordance with the video signal which is supplied to said CRT.

To solve the foregoing problems, according to the invention, there is provided a display method for displaying video signals having two or more different formats by one CRT, comprising the steps of: detecting a kind of the video signal; and switching a bias voltage to said CRT in accordance with the detected kind of said video signal.

To solve the foregoing problems, according to the invention, there is provided a display apparatus for displaying a single video signal by one CRT, comprising: bias voltage output means for outputting a bias voltage to said CRT; and voltage switching means for switching said bias voltage which is outputted from said bias voltage output means for a predetermined period of time.

As mentioned above, according to the invention, since the bias voltage to the CRT is switched in accordance with the video signal which is supplied to the CRT, the luminance and resolution of the CRT can be changed without changing a driving voltage.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention will now be described hereinbelow with reference to the drawings. According to the invention, by fixing a driving voltage of a CRT and adaptively switching a bias voltage of the CRT, proper luminance and resolution can be obtained for a plurality of kinds of video systems having different video signal formats. The bias voltage of the CRT denotes an anode voltage which is applied to the CRT and a cut-off voltage (which will be explained hereinlater).

Figure 1:
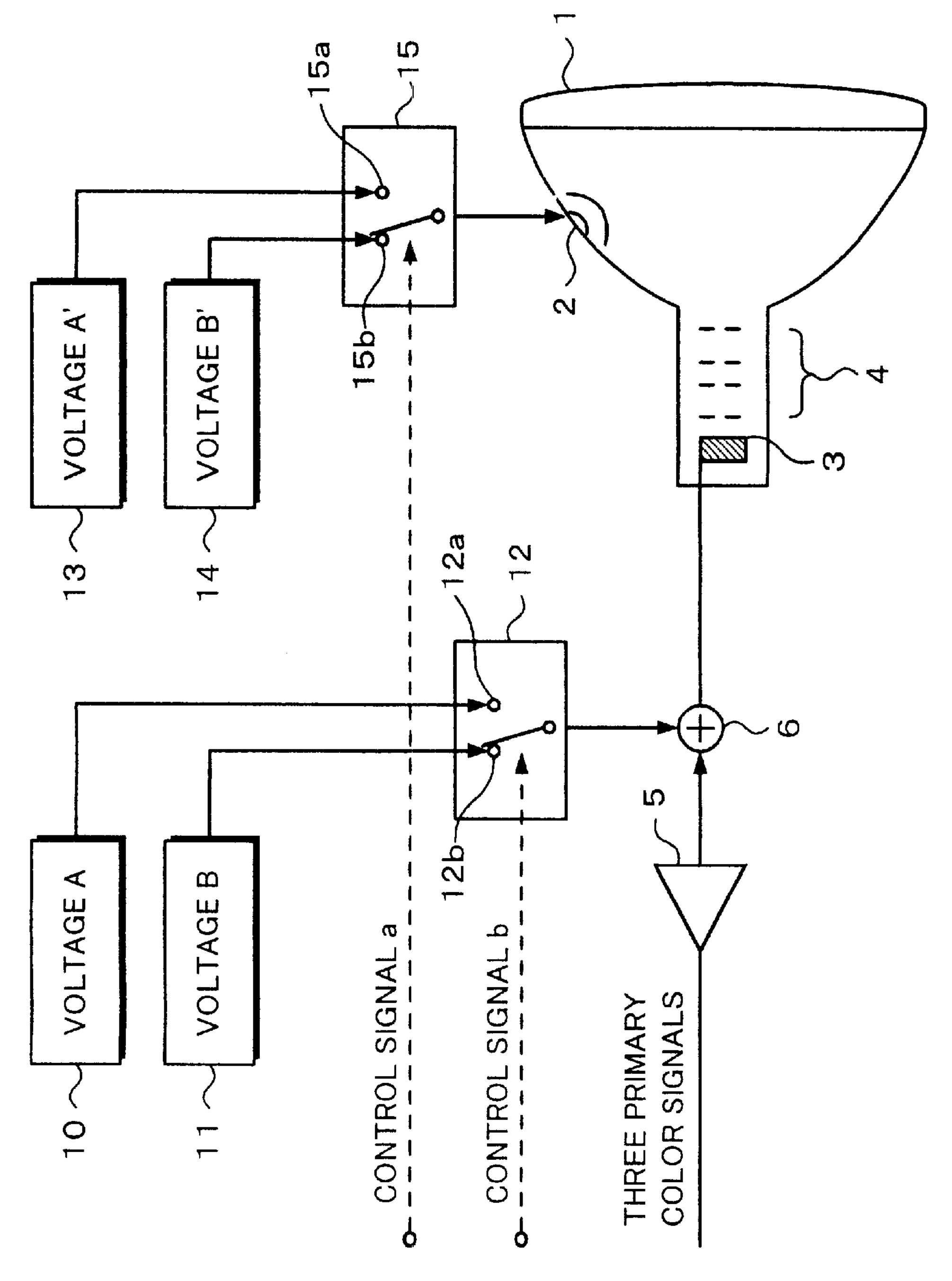
FIG. 1 is a block diagram showing an example of a construction around a power source of a CRT of a display apparatus according to an embodiment.

FIG. 1 shows an example of a construction around a power source of the CRT of a display apparatus according to the embodiment. This diagram relates to an example corresponding to two kinds of video signals (a video signal A, a video signal B) having different formats. For instance, the video signal of the NTSC system and the video signal from a personal computer can be applied to the video signals A and B, respectively. An anode electrode 2 to which a high voltage is applied, a cathode electrode 3 to which a chrominance signal voltage is supplied, and a plurality of grids 4 are provided for a CRT 1. For example, three primary color signals outputted from a chrominance signal processing circuit of a well-known television receiver are supplied to a driving circuit 5. The three primary color signals are raised to a cathode voltage by the driving circuit 5 and are applied to the cathode 3 through an adder 6.

In FIG. 1, to avoid complexity, a system of a video signal is shown while representing one of the colors of the three primary color signals, for instance, R (red).

A voltage source 10 generates a bias voltage A corresponding to the video signal A. A voltage source 11 generates a bias voltage B corresponding to the video signal B. The bias voltages A and B are supplied to terminals 12*a* and 12*b* of a switching circuit 12, respectively. An output of the switching circuit 12 is supplied to the adder 6. The switching operation of the switching circuit 12 is controlled by a control signal b. In the adder 6, a voltage obtained by adding the bias voltage selected by the switching circuit 12 to an output of the driving circuit 5 is applied to the cathode electrode 3.

A voltage source 13 generates an anode voltage A' corresponding to the video signal A. A voltage source 14 generates an anode voltage B' corresponding to the video signal B. The anode voltages A' and B' are supplied to terminals 15*a* and 15*b* of a switching circuit 15, respectively. An output of the switching circuit 15 is supplied to the anode electrode 2. The switching operation of the switching circuit 15 is controlled by a control signal a.

The control signals a and b are made to correspond to the displays of the video signals A and B. For example, when the signal to be displayed on the CRT 1 is switched from the video signal A to the video signal B by a predetermined mode signal, the control signals a and b are set to the signals corresponding to them, respectively. The switching circuits 15 and 12 are controlled so as to select the corresponding voltage source, respectively.

The above construction can also cope with a case where video images by a plurality of kinds of video signals of different systems are simultaneously displayed on a display screen of the CRT 1 like a display called a picture-and-picture or a picture-in-picture such that a video image by the video signal B whose size is smaller than that of the video image A is inserted and displayed in a part of the display screen of the CRT 1 on which the video image A by the video signal A has been displayed. In this case, the control signals a and b are switched for predetermined periods of the horizontal scan and the vertical scan in accordance with display areas of the video images A and B.

Figure 2:
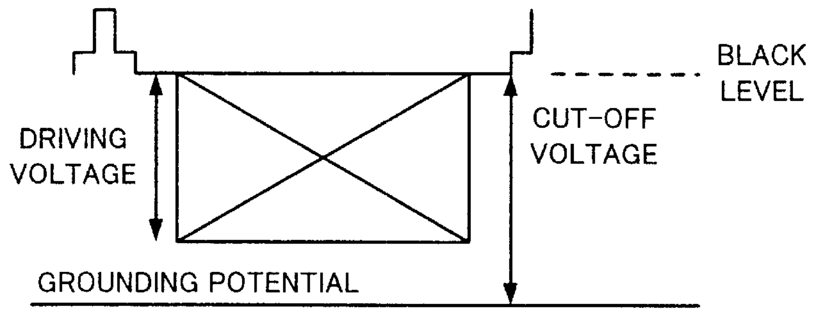
FIG. 2 is a schematic diagram showing an outline of a signal waveform in a cathode electrode.

FIG. 2 schematically shows a signal waveform in the cathode electrode 3. The diagram shows the waveform of one horizontal period. A signal voltage is set to a positive potential for the grounding potential. The video signal is set to a high luminance toward the grounding potential side while setting the voltage at the black level to a reference. A pedestal level and a horizontal sync signal are inserted before and after the video signal at a potential higher than the black level.

In the CRT 1, the black level potential is an electric potential of the level where electrons emitted from the cathode 3 never reach the fluorescent surface and is called a cut-off voltage. As mentioned above, the cut-off voltage and the anode voltage are called CRT bias voltages here. A dynamic range of the video signal voltage, namely, a potential difference between the upper limit and the lower limit of the video signal is called a driving voltage.

As is well known, in the CRT 1, an electron beam emitted from the heated cathode 3 is accelerated and converged by the grid 4 comprising a plurality of grids whose voltages have been controlled to predetermined values and is irradiated to a predetermined position on the fluorescent surface, thereby causing a luminescent point. In consideration of the above principle, how the CRT bias voltage contributes to the luminance and resolution of the video image which is displayed on the CRT 1 will now be described.

Figure 3:
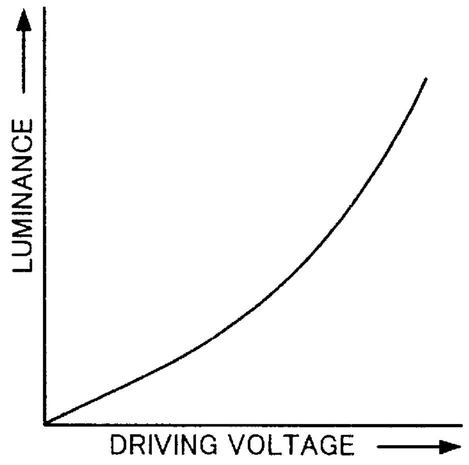
FIG. 3 is a schematic diagram showing an example of a relation between a driving voltage and a luminance.
Figure 4:
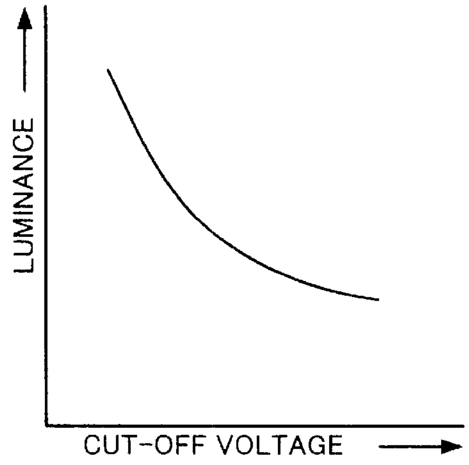
FIG. 4 is a schematic diagram showing an example of a relation between a cut-off voltage and the luminance.
Figure 5:
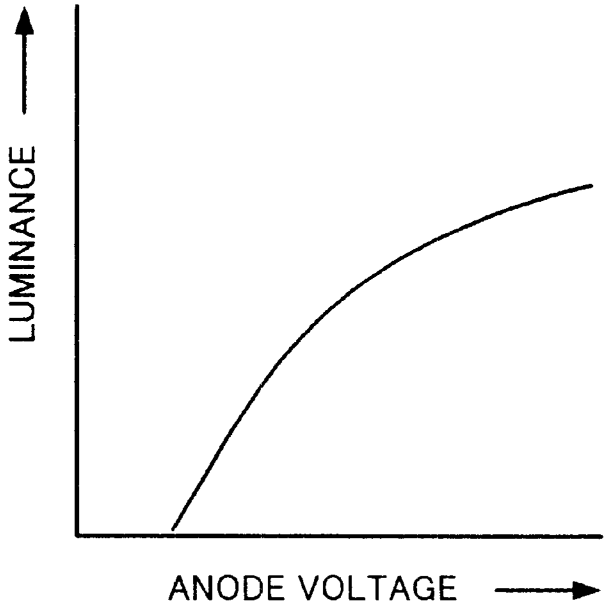
FIG. 5 is a schematic diagram showing an example of a relation between an anode voltage and the luminance.

First, as methods of realizing the high luminance of the video image without changing the black level of the video image, there are three kinds of methods such as (1) step-up of the driving voltage, (2) step-down of the cut-off voltage, and (3) step-up of the anode voltage. FIGS. 3 to 5 schematically show changes in luminance by those methods. According to the method of stepping down the cut-off voltage of (2), as shown in FIG. 4, the luminance rises in association with the step-down of the cut-off voltage. According to the method of stepping up the anode voltage of (3), as shown in FIG. 5, the luminance rises in association with the step-up of the anode voltage.

Since the method (1) (FIG. 3) of raising the luminance by stepping up the driving voltage causes an increase in costs of the driving voltage generating circuit or an increase in unnecessary radiation, this method does not satisfy the object of the invention, as already mentioned in the prior art.

Figure 6:
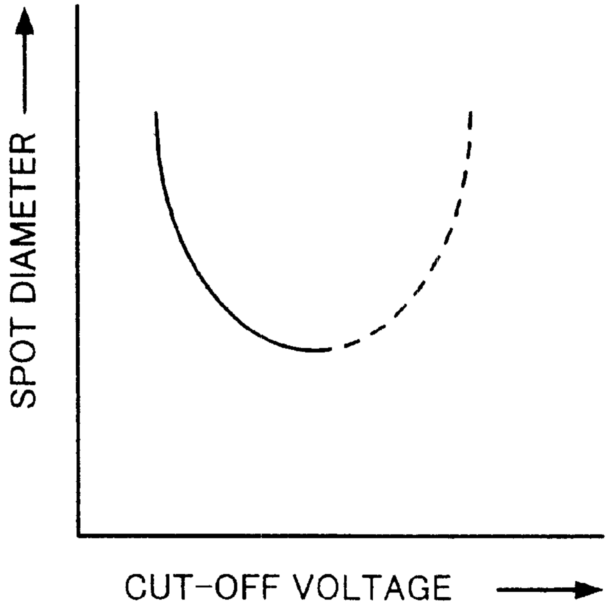
FIG. 6 is a schematic diagram showing an example of a relation between the cut-off voltage and a spot diameter.
Figure 7:
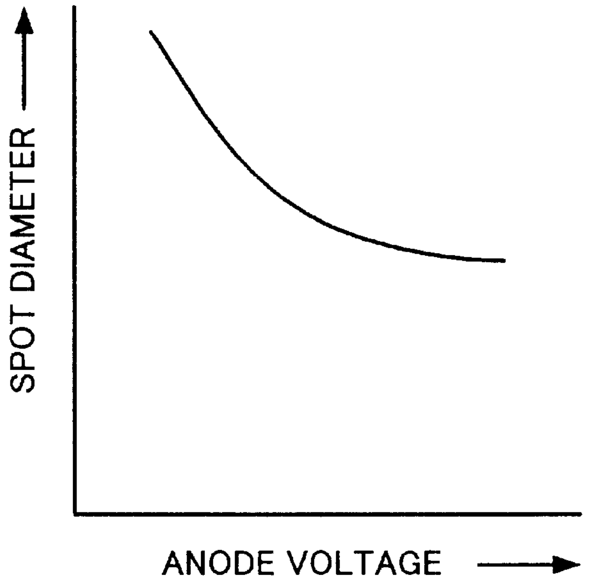
FIG. 7 is a s schematic diagram showing an example of a relation between the anode voltage and the spot diameter.

A method of realizing the high resolution of a video image will now be described. In the CRT 1, to raise the resolution of the video image, it is sufficient to reduce a diameter of the spot on the screen of the CRT 1 by the irradiation of an electron beam. For this purpose, there are two kinds of methods: (4) a step-up of the cut-off voltage; and (5) a step-up of the anode voltage. FIGS. 6 and 7 show changes in spot diameter by those methods.

According to the method (4) of stepping up the cut-off voltage, as shown in FIG. 6, the spot diameter becomes a minimum at a predetermined cut-off voltage due to the step-up of the cut-off voltage. As shown in FIG. 4 mentioned above, when the cut-off voltage is increased, the luminance decreases. It is, therefore, preferable to use the method (4) while limiting to the case where only the high resolution is required.

According to the method (5) of stepping up the anode voltage, as shown in FIG. 7, the spot diameter decreases in association with the step-up of the anode voltage. According to this method, as shown in FIG. 5 mentioned above, the luminance also rises due to the step-up of the anode voltage. According to this method, therefore, the high resolution of the video image can be accomplished and the high luminance can be also realized.

As will be also understood from the above description, by selecting the cut-off voltage and anode voltage of the CRT 1 in accordance with the video signal, the video image which is displayed to the CRT 1 can be set to proper resolution and luminance. It is preferable to set and decide the cut-off voltage and anode voltage in correspondence to each of the video signals of different formats on the basis of the characteristics of the CRT 1 which is actually used and the characteristics of the video signal and, further, the characteristics of the circuit to process the video signal and the like.

According to the embodiment, as shown in FIG. 1 mentioned above, the voltage sources 10 and 11 are provided for the cut-off voltage and the voltage sources 13 and 14 are provided for the anode voltage in correspondence to the kind of video signal to be displayed, respectively. The proper ones of the voltage sources 10 and 11 and voltage sources 13 and 14 are selected by switching the switching circuits 12 and 15 in accordance with the video image to be displayed on the CRT 1, namely, in accordance with the kind (system) of video signal which is supplied to the cathode electrode 3, respectively.

Figure 8:
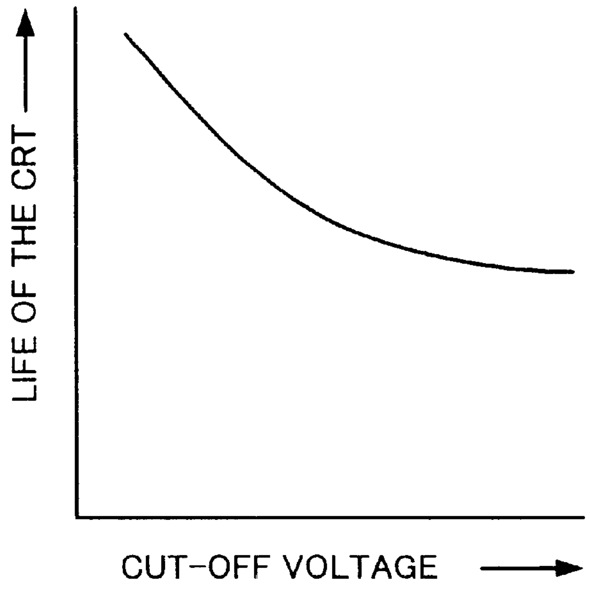
FIG. 8 is a schematic diagram showing an example of a relation between the cut-off voltage and a life of the CRT.

As shown in FIG. 8, the life of the CRT 1 can be extended as the cut-off voltage is lower. As mentioned above, since the high luminance can be obtained when the cut-off voltage is low, the life of the CRT 1 can be extended by using the embodiment.

Figure 9A:
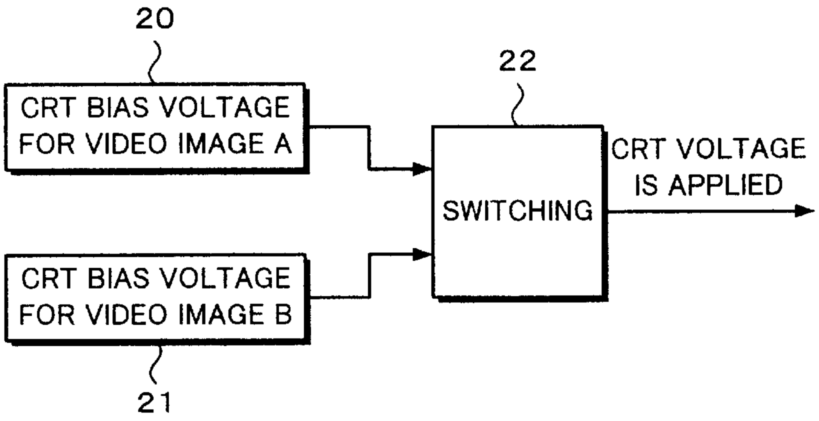
FIGS. 9A and 9B are block diagrams each showing an example of a method of switching a CRT bias voltage.
Figure 9B:
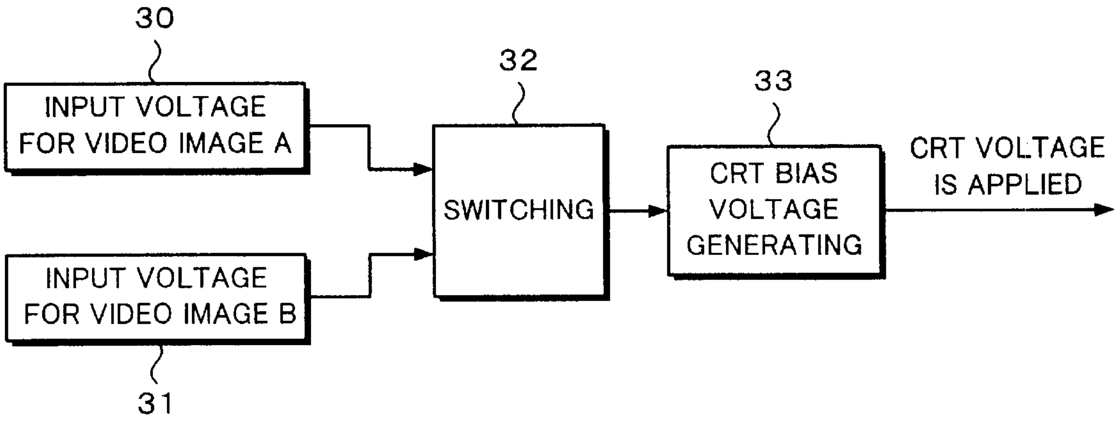

FIGS. 9A and 9B show examples of a method of switching the CRT bias voltage to be applied to the CRT 1, namely, the cut-off voltage and anode voltage. FIG. 9A shows a method whereby a CRT bias voltage for the video image A and a CRT bias voltage for the video image B are directly generated by voltage sources 20 and 21 and are switched by a switching-circuit 22. In the example shown in FIG. 1 mentioned above, this method is used.

The switching operation by the switching circuit 22 is controlled by, for example, a predetermined control signal and can be performed by, for instance, a mechanical method by a switch, a relay, or the like or an electrical method by a switching transistor or the like. For example, it can be also performed by a circuit control by using a control IC (Integrated Circuit) such as a microcomputer or the like. The switching operation of the switching circuit 22 can be also obviously manually performed. As mentioned above, the switching operation by the switching circuit 22 can be also executed by any one of the hardware-like method and the software-like method.

FIG. 9B shows an example in which a CRT bias voltage generating circuit 33 such that a corresponding voltage is generated by a predetermined control voltage is provided. The predetermined control voltage is supplied to the CRT bias voltage generating circuit 33, thereby allowing an applied voltage to the CRT 1 to be indirectly generated. Control signals corresponding to the video images A and B are generated by input voltage sources 30 and 31, respectively. The control voltages generated from the voltage sources 30 and 31 are switched by a switching circuit 32 which is controlled by a predetermined control signal and the switched control voltage is supplied to the CRT bias voltage generating circuit 33. In this example as well, the switching operation by the switching circuit 32 can be also performed by any one of the hardware-like method and the software-like method.

The means for generating the CRT bias voltage by different voltage values is not limited to the above two methods. For instance, the CRT bias voltage can be also obtained by dividing the voltage by one voltage source.

The invention can be applied to a display apparatus such that the video signals having different formats by two or more kinds of systems are displayed by one CRT. In this instance, the video signals of different formats can be individually displayed to one CRT or the display by one video signal and a display by a video signal of another system having a format different from that of the video signal can be also simultaneously performed.

As a more specific example, a CRT monitor such that a video image by the television broadcasting (NTSC system and/or HDTV system) and a video image by the personal computer are displayed by one CRT is mentioned. The video images of those different systems are simultaneously or individually displayed by one CRT.

In the video image by the personal computer, since it is necessary to display, for example, fine characters, high resolution is required. In the video image by the television broadcasting by the NTSC system or HDTV system, since a more powerful expression is needed, a high luminance is required. The high resolution and high luminance of the video image are contradictory in the CRT characteristics. That is, if a beam current from the cathode electrode 3 is increased in order to realize the high luminance, the spot diameter on the fluorescent surface increases. If it is intended to realize the high resolution, the spot diameter decreases and the luminance is reduced.

To optimize each of them by one CRT, therefore, it is necessary to apply individual CRT bias voltages to the CRT. Therefore, by switching the CRT bias voltages such as cut-off voltage and anode voltage in accordance with the video image and performing the operation by using the embodiment, the different CRT bias voltages are applied to the CRT every video image of the different format. Thus, the video images of the different systems can be displayed by the optimum resolution and luminance, respectively.

The invention can be also applied to a CRT such that only the video signal by a single system is displayed. For instance, in the case where the video image by the personal computer is displayed to the CRT, by switching the CRT bias voltage for only a predetermined period of the video signal, the partial high resolution and high luminance of the video image can be realized.

When a video image which does not need high resolution (for instance, personal computer video image of low resolution) is displayed to the CRT, by switching the CRT bias voltage so as to enlarge the spot diameter in accordance with the resolution, the life of the CRT can be extended.

Although the example in which the invention corresponds to two kinds of video images by the different systems has been described above, the invention is not limited to this example. That is, the invention can be made to correspond to video images by three or more different systems by increasing the number of voltage sources and switching circuits to be selected.

As described above, according to the invention, the CRT bias voltages such as cut-off voltage and anode voltage are switched in accordance with the system of the video signal to be displayed. Therefore, there is an effect such that even in the case where the video images by the different systems are displayed to one CRT, the video image can be displayed at the resolution and luminance which are optimum for each of the video images.

There is also an effect such that even in a CRT for displaying a video image of a single system, partial high resolution and high luminance of the video image can be realized.

Further, according to the invention, by switching the cut-off voltage and anode voltage without changing the driving voltage of the CRT, the high resolution and high luminance of the video image are realized. Therefore, there are effects such that it is unnecessary to change the dynamic range of the driving voltage generating circuit and the costs of the driving voltage generating circuit are not increased.

Moreover, since the driving voltage is not stepped up, there is an effect such that even if the high resolution and high luminance of the video image are realized, the unnecessary radiation from the CRT does not increase.

When the video signal from the personal computer is displayed to the CRT, for example, by switching the CRT bias voltage in accordance with the increase in resolution of the signal, the spot diameter is reduced and the high resolution of the display video image can be accomplished. Further, in case of displaying the video signal which does not need high resolution, there is an effect such that the life of the CRT itself can be extended by switching the CRT bias voltage so as to increase the spot diameter.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A display apparatus comprising:

a CRT having an anode;

a driving voltage source driving the CRT in response to either a interlace video signal or a non-interlace video signal;

an anode bias voltage device having a switch that biases the anode with a first anode voltage or a second anode voltage, the anode bias voltage device being responsive to an anode control signal to select the first anode voltage or the second anode voltage, the anode control signal being issued in response to whether the interlace video signal or the non-interlace video signal is provided to the CRT; and a cut-off voltage bias device having a cut-off switch that biases the driving voltage source with a first cut-off voltage or a second cut-off voltage, the cut-off voltage device being responsive to a cut-off control signal to select the first cut-off voltage or the second cut-off voltage, the cut-off control signal being issued in response to whether the interlace video signal or the non-interlace video signal is provided to the CRT.

* * * * *